Hans W. A. Borg
INVENTOR.

BY

3,125,362
HIGH AND LOW TEMPERATURE JOINT SEALING ASSEMBLY
Hans W. A. Borg, 4314 N. Maupin Ave., Baldwin Park, Calif.
Filed Mar. 1, 1961, Ser. No. 92,549
4 Claims. (Cl. 285—340)

This invention relates to certain new and useful improvements in a leak-proof seal for pipe and analogous joints and has to do with a simple, practical two-part static seal construction which lends itself to effective and reliable use under high and low pressure requirements and extremely high and low temperature applications.

In carrying out the invention a feasible and facile construction and arrangement of unique component parts is resorted to and these, when cooperatively mounted and properly bound or bonded to coacting surface-parts, result in but a single vulnerable area or place capable of leakage but which offers two sealed joints to offset and reliably avoid such leakage. To this end the sealing surfaces relied upon are incorporated in the seal itself; namely, the two principal component parts, as will be hereinafter more fully revealed.

Another improvement residues in the fact that the particular construction and abutting relationship of the comparatively simple parts makes the installation step expedient and easy. Moreover, installation tolerances need not be too strict because a novel built-in end thrust truncated conical seal ring or annulus functions in conjunction with a suitable seal washer, said annulus constituting an effective way of exerting prerequisite spring loaded force upon the washer and coacting sealing surfaces between the washer and truncated end of the seal ring to give protection against leakage.

The improved seal can be aptly used for light in weight bodies of aluminum in a manner to obtain a saving in weight. It can be bonded on poppets and used satisfactorily in valve structures for static seals. By using corrosion-resistant materials, usage in many fields of endeavor is not limited and in addition, the seal parts or components will not be adversely affected by damaging radiation. Then, too, a seal as herein disclosed can be used where storage conditions are involved.

Figure 1:
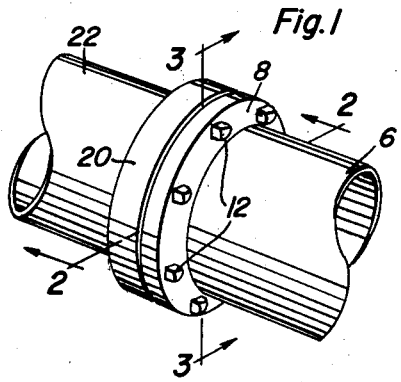
Figure 4:
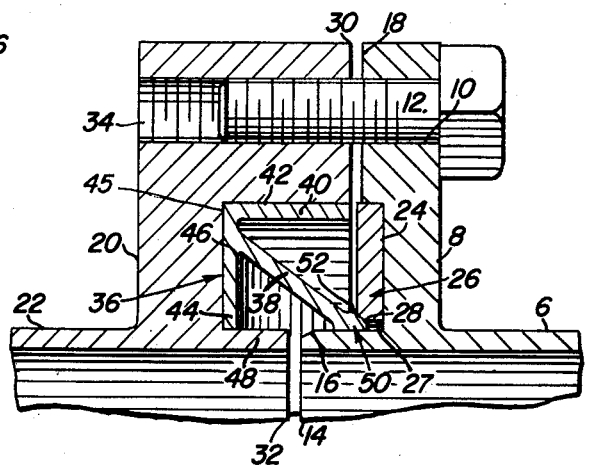
Figure 3:
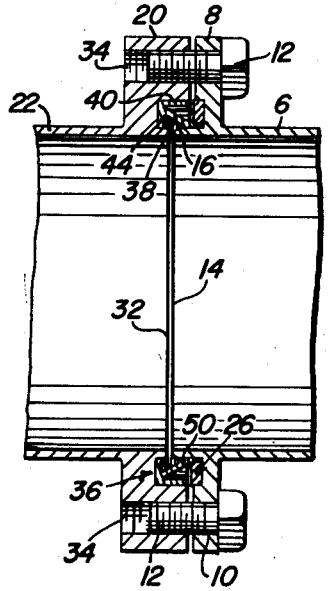
Figure 2:
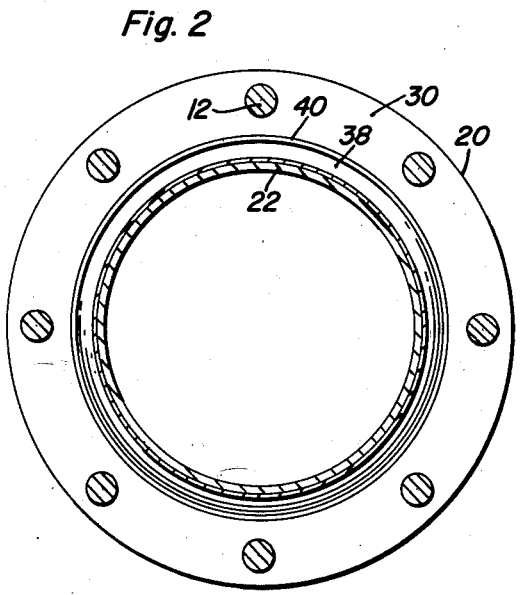

These together with other objects and advantages which will become subsequently apparent residue in the details of construction and operation as more fully hereinafter described and claimed, reference being had to the accompanying drawings forming a part hereof, wherein like numerals refer to like parts throughout, and in which:

FIGURE 1 is a fragmentary perspective view showing a pipe joint with the improved seal (not shown) embodied therein;

FIGURES 2 and 3 are enlarged views taken on the section lines 2—2 and 3—3, respectively, of FIGURE 1; and, FIGURE 4 is an exaggerated view in section and elevation illustrating the essential features of the improved seal and how they are constructed and cooperate.

By way of introduction to the description of the details it is to be pointed out that the two significant components or parts are preferably made of corrosion resistant materials (steel, ceramic, aluminium, bronze or the like) fitted and braced in suitably conforming recesses provided therefor in the structure whose portions and surfaces need to be sealed off. Depending on the materials of which the parts are made, the seal may be effectively used for high and low temperature applications (minus 420 degrees F. to 2000 degrees F. or higher) and for high and low pressures as well as for certain vacuum applications.

With a view toward simplifying the present disclosure, the seal is illustrated as incorporated in a pipe line, that is the jointed ends of the pipe sections. The pipe section at the right in the drawing is denoted by the numeral 6 and is provided with a surrounding outstanding flange 8 having bolt holes 10 for passage of the bolts 12. It will be noted that this flange is spaced inwardly of the projecting lip or terminal portion 14 and that the leading edge of said portion 14 is beveled for clearance as at 16. The surface or face 18 directed toward the complemental flange 20 on the pipe section 22 is provided, adjacent to the periphery of the terminal 14, with a relatively shallow groove 24 into which the first part, the seal or packing washer 26 is fitted and bonded in place. It should be noted in FIGURE 4 that the inner peripheral edge 28 of the washer is spaced from the peripheral surface of the pipe section to provide a space 27. Also the corner of this edge portion 28 is chamfered or beveled in the manner shown.

With reference to the pipe section 22 and the flange 20 it will be noted that this flange is a heavy duty flange and is of a cross-section appreciably greater than the cross-section of the flange 8 with the righthand surface 30 projecting beyond and overhanging the terminal edge 32 of said pipe section 22. This flange is provided with a hole 34 FIG. 4 in alignment with the hole 10 and threaded to accommodate the screw-threaded shank of the flange connecting and axial compression exerting bolt. The second unit or part of the two part seal is denoted as an entity by the numeral 36 and it is characterized chiefly by a rigid but springy truncated conical annulus or seal ring 38. This ring slants at an oblique angle from left to right and is directed toward the washer 26 particularly toward the space existing between the peripheral edge 28 and the pipe section surface encompassed by said edge. A positioning adapter and carrier is provided for the seal ring 38. This adapter substantially L-shaped in cross section is fitted with requisite nicety into a channel provided in the flange 20 and opening through the face 30. The annular rim portion 40 of the adapter is seated and braced firmly against the coacting wall 42 of the channel. At the left this rim portion is provided with a right angularly disposed stabilizing abutment or flange 44 which is braced firmly against the coacting wall 46 of the channel. The outer annular wall or rim flange of the adapter 36 is disposed in firm abutting relationship with the outer encompassing channel wall 42. In practice the outer peripheral surface of the flange is plated with soft sealing media, silver for example, to guard against leakage. The complemental abutment or flange 44 to which the left end of the seal ring is joined as at 46 serves as an effective support and end thrust means for said seal ring and in practice is bonded to the bottom wall of the channel (not detailed). Hence by thus conformingly and securely seating the adapter in the confining channel it constitutes a secondary seal.

Also, it functions to protect the primary or inner seal from overstressing while providing enough spring-load on the sealed surfaces to prevent the same from permitting leakage. The inner peripheral edge of the flange 44 tightly circumscribes the coacting outer peripheral surface of the lip 48 of the pipe section terminal 32. There is an existing space between the terminals 14 and 32 as brought out in FIGURE 4. It is significant to note that the truncated edge portion of the end thrust seal ring or annulus 38 is increased in cross-sectional thickness and terminates in what is here conveniently described as a ring-like collar 50. The tip of the collar projects into the aforementioned space 27 and the substantially smooth inner peripheral surface of the collar tightly embraces the end of the pipe section surrounded thereby. Also, and this is important, the outer peripheral surface of the collar 50 is provided with a bevel 52 which is mated to coact with the beveled corner 28 of the washer 26.

In practice the groove 24 and opposed channel in the flange 20 are precision-machined, as are the coacting surfaces of the washer 26 and the seal ring adapter. The inner peripheral surface of the wedge-like collar 50 snugly surrounds and embraces the coacting peripheral surface of the pipe end 14 with which it cooperates as is evident in FIGURE 4. It follows that distortion of shape under high loads is thus reduced to a minimum. The bevel 52 is preferably in the form of a high polished ball seal configuration with a precision finish. The surface 28 is also of prerequisite seal configuration.

This invention is structurally and functionally capable of providing and progressively maintaining a reliably effective fluid-tight sealing result under fluctuating high and low temperature and pressure conditions. Applied axial forces resulting from progressively tightening the adjustably bolted flanges 8 and 20 effect a reliable seal between the compensating surfaces 52 and 28 of the seal ring 38 and packing washer 26 and, in addition, by reason of the fact that the washer is securely seated and properly bonded in the groove 24 and partly retained by reason of the fact that the outer peripheral edge of the washer firmly abuts the stop shoulder defined by the outer marginal edge of the groove. This result is aided by the snug fit of the surface 50 hugging the encompassed peripheral surface of the pipe end 14. The desired axial thrust is achieved in part through the medium of the end thrust flange 44 to which the springy seal ring 38 is joined as at 46. The seal ring spans the space between the terminal end portions of the two pipe sections, that is, the ends denoted at 14 and 32. Then, too, the annulus or rim 40 binds against the outer channel wall 42 and provides a secondary seal which contributes its proportionate share to the over-all sealing effect of the seal assembly. Then, too the flange 44 is bonded to the bottom wall 42 of the channel.

A careful consideration of the specification in conjunction with the views of the drawing will enable the reader to obtain a clear understanding of the construction and operation. Therefore, a more extended description is believed to be unnecessary.

Minor changes in shape, size, and materials may be resorted to in actual practice without departing from the spirit of the invention or the scope of the invention as comprehended in the following claims.

What is claimed as new is as follows:

1. A high and low temperature joint sealing assembly comprising, in combination, a first pipe section having a terminal end portion provided with an integral outstanding flange having a radial face provided with a channel concentrically encircling an outer peripheral surface of said terminal end portion, the extremity of said terminal end portion terminating within said channel and also terminating short of the open side of said channel, a second pipe section cooperative with said first pipe section and having a terminal end portion in axial alignment and spaced from the terminal end of said first pipe section and provided with an integral outstanding flange having a face thereof opposed to and spaced from said radial face and having an annular groove opposed to and registering with the cooperating open side of said channel, the outer peripheral edge of said groove providing a stop shoulder, a rigid packing washer seated and bonded in said groove and having an outer peripheral edge abutting said stop shoulder and having an inner peripheral edge encircling and spaced from the cooperating peripheral surface of the terminal end portion of the second pipe section and cooperating therewith in defining an annular space, a truncated conical seal ring, an adapter carrying and having component portions circumferentially encompassing said seal ring, said adapter being conformingly seated and securely retained and sealed within the confines of said channel, said component portions abutting cooperating walls of said channel, the truncated end of said seal ring projecting through the open side of said channel and terminating in an endless annular joint-sealing collar, said collar having a smooth-finished inner peripheral surface snugly embracing the outer peripheral surface of the terminal end portion of said second pipe section and nosing and wedging itself into the aforementioned annular space, the outer peripheral surface of said collar having tight fitting engagement with the cooperating inner peripheral edge of said packing washer and cooperating therewith and providing a leak-proof seal.

2. The structure defined in claim 1, and wherein that corner portion of the inner peripheral edge of the washer proximal to said collar is beveled and the coacting outer peripheral surface of the collar is likewise correspondingly beveled, said surfaces being machined and finished for close tolerance mating engagement.

3. The structure defined in claim 2, and wherein one component portion of said adapter comprises an annular rim, and the other component portion comprises an annular flange integral with and at right agnles to the rim, said conical seal ring being constructed of springy material and having one end joined to and carried by a median portion of said annular flange.

4. A high and low temperature and pressure sealing assembly comprising, in combination, a first pipe section having a terminal end portion provided with an encompassing outstanding integral flange, said flange having a radial face provided with a channel encompassing the outer peripheral surface of said end portion, said end portion defining and providing the inner wall of the channel, a second pipe section cooperable with said first pipe section and having a terminal end portion positioned in axial alignment therewith and spaced therefrom, said last named terminal end portion also having an integral outstanding flange with a radial face thereof opposed to and spaced from said first named radial face and provided with a groove in axial alignment with the open side of said channel, the outer marginal edge of said groove providing an endless stop shoulder, said flanges being bolted together, a rigid packing washer lodged and bonded in said groove, the outer marginal edge of said washer abutting said shoulder, the inward marginal edge of said washer encompassing and being spaced radially from the cooperating outer peripheral surface of said second-named terminal end portion and defining an endless annular space, said last-named terminal end portion projecting axially beyond the plane of said washer, an adapter confined in said channel and having a first annular flange seated and bound against the outer wall of said channel, and a second annular end thrust flange superimposed upon the bottom wall of the channel and having its inward marginal edge snugly surrounding the adjacent peripheral surface of the first-named terminal end portion, and a truncated conical seal ring having one end affixed to said end thrust flange, the median portion of said seal ring bridging the existing space between the respective terminal end portions, the truncated end portion of said seal ring projecting through and beyond the open side of said channel and terminating in an endless annular joint sealing collar, said collar having a smooth-finished inner peripheral surface snugly embracing the outer peripheral surface of the terminal end portion of said second pipe section and nosing and wedging itself into the aforementioned annular space, the outer peripheral surface of said collar having tight fitting engagement with the cooperating inner peripheral edge of said washer and providing a leak-proof seal.

References Cited in the file of this patent

UNITED STATES PATENTS

| | | |
|---|---|---|
| 739,624 | Traver | Sept. 22, 1903 |
| 1,721,325 | Wilson | July 16, 1929 |
| 1,965,273 | Wilson | July 3, 1934 |
| 2,075,947 | Kennedy | Apr. 6, 1937 |
| 2,745,683 | Nihlen | May 15, 1956 |
| 2,898,000 | Hanny | Aug. 4, 1959 |
| 2,992,840 | Reynolds et al. | July 18, 1961 |
| 3,047,300 | Taylor et al. | July 31, 1962 |
| 3,047,301 | Taylor et al. | July 31, 1962 |

FOREIGN PATENTS

| | | |
|---|---|---|
| 142,770 | Austria | Jan. 15, 1935 |
| 712,786 | Great Britain | July 28, 1954 |
| 352,890 | Switzerland | Jan. 22, 1957 |